United States Patent [19]

Huntt

[11] 4,126,723

[45] Nov. 21, 1978

[54] PROCESS FOR ASSEMBLING TOROIDS FROM AN INTERMEDIATE PRODUCT HAVING A COMBUSTIBLE INTERLAYER

[75] Inventor: Robert L. Huntt, Damascus, Md.

[73] Assignee: Trans-Tech, Inc., Gaithersburg, Md.

[21] Appl. No.: 818,849

[22] Filed: Jul. 25, 1977

[51] Int. Cl.[2] .......................... B32B 1/06; B32B 5/00; B32B 31/26

[52] U.S. Cl. .................................... 428/357; 156/155; 428/913

[58] Field of Search ........................ 428/357; 156/155; 428/913; 333/31 A

[56] References Cited

U.S. PATENT DOCUMENTS

| | | | |
|---|---|---|---|
| 2,853,643 | 9/1958 | Iversen | 333/31 A |
| 2,972,079 | 2/1961 | Wolkstein | 333/31 A |
| 3,609,596 | 9/1971 | Morgenthaler | 333/31 A |

*Primary Examiner*—J.C. Cannon

*Attorney, Agent, or Firm*—Murray & Whisenhunt

[57] ABSTRACT

An assembly including a ceramic insert and a surrounding dielectric filler in a ferrite or garnet toroid is disclosed, wherein a void is provided into which the dielectric filler can expand, such as by the formation of a temporary layer of liner material on an outer surface of the ceramic insert, or on the liner surface of the toroid, or on both. The ceramic insert is inserted into the toroid, and then the void between the ceramic insert and the toroid is filled with a dielectric heat-curable composition. Then the filled assembly is heated to an elevated temperature to burn out said liner. The liner material burns at a temperature of about 100° F to a temperature which is at least 20° F below the curing temperature of the dielectric heat-curable composition, and preferably the liner burns at a temperature below about 300° F, to leave essentially no ash adversely affecting the resulting assembly. The dielectric composition is then cured, and the space left in the assembly by burning out the liner permits relative expansion and/or contraction of the insert, the toroid and the filler so the residual stresses in the final assembly are low.

The assembly of the present invention is highly suitable for use in the production of phase shifters having a toroidal arrangement, where it is desired to eliminate any air gaps between the toroid and the ceramic insert, while avoiding or minimizing residual stresses in the final toroid assembly.

8 Claims, 3 Drawing Figures

PROCESS FOR ASSEMBLING TOROIDS FROM AN INTERMEDIATE PRODUCT HAVING A COMBUSTIBLE INTERLAYER

BACKGROUND OF THE INVENTION

It has long been known that in the use of ferrite and garnet assemblies, noticeably for microwave phase shifter applications, wherein a dielectric insert is surrounded by a ferrite or garnet toroid, it is quite important that the fit of the dielectric insert into the ferrite or garnet toroid involve little or no air gap. Ceramically this is impossible, and therefore the microwave industry has generally adopted a method wherein a dielectric filler is used to reduce or eliminate the air space between the toroid and the dielectric insert. The dielectric filler material is generally a thermosetting polymer which may be doped with suitable materials, such as titanium dioxide. This use of dielectric filler materials has resulted in problems ranging from cracking of the toroids themselves to the production of internal stresses in the final assembly, with a resulting degradation of the electrical performance of the toroid due to magnetostrictive effects.

SUMMARY OF THE INVENTION

The present invention overcomes the toroid cracking problem and the degradation of the toroid electrical performance problem by forming a gap into which the assembly may expand, such as by using a temporary liner on at least one of the surfaces facing the area into which the dielectric heat-curable filler is placed. This liner will be on the outer surface of the ceramic insert, the inner surface of the toroid assembly, or both. A dielectric filler is used to fill the void between the ceramic insert and the toroid and the assembly is subjected to a temperature which burns out the liner, thereby leaving room for the relative expansion or contraction of the various components of the assembly, so that undue stress is not placed upon the assembly, and the residual stresses remaining in the final assembly are below that required to change the $B_R$ value of the original toroid by more than 5%. Thereafter the assembly is heated to a higher temperature which cures the dielectric filler. Any residual liner material or ash in the final assembly is such as to result in a dielectric loss value change of less than 10% of the dielectric loss value of the original toroid.

DETAILED DESCRIPTION OF THE INVENTION

The present invention is directed to filling the cavity between a ceramic toroid and a ceramic insert therein with a dielectric filler, without producing internal stresses which might result in cracks in the toroid or degradation of the electrical performance of the toroid, or both.

It has been found that the internal stress reduction or elimination can be accomplished by providing a gap on one or both sides of the dielectric filler. This gap is preferably formed by using a temporary liner on the inner diameter of the toroid, or on the outer diameter of the ceramic insert, or on both, which liner will burn off during the curing cycle to leave a space into which, for instance, the dielectric filler can expand, without producing undue stresses on the toroid assembly. The thickness of liner material, and therefore the space for expansion, can be controlled by controlling the thickness of the applied liner material, and also by choice of whether one or two surfaces, as indicated above, are coated with the liner material. The desired thickness of the liner material will depend upon a number of factors, including the coefficients of thermal expansion and the dimensions of the toroid, the dielectric filler, and the ceramic insert. Thicknesses of liner material as thin as 0.5 mils or even thinner are satisfactory for certain configurations, and materials, but it will be readily appreciated that it is impractical to specify a numerical range of thicknesses, due to the differences which will be encountered between various types of toroid assemblies. Thus, it is believed more meaningful to specify the thickness of the liner material in terms of functional results. In general terms, however, the thickness of the liner material will normally be between 5 and 20% of the space between the ceramic insert and the ferrite or garnet toroid (that is, the space into which the prior art has placed the dielectric filler). More preferably, the gap which is formed to compensate for expansion and/or contraction of the toroid components will be from 7 to 15% of the space between the ceramic insert and the ferrite or garnet toroid, most preferably about 10% of such width.

The liner material is generally a film-forming polymer, which can be applied in solution, dispersion or emulsion form to adhere to the toroid and/or the ceramic insert. The liner material must burn out upon firing to a temperature below the curing temperature of the dielectric filler, with residual ash being non-existent or else such as to not exhibit substantial electromagnetic properties. It is strongly preferred that the liner exhibit clean burn-out, with no residual ash being left.

The liner material may be applied by any convenient method, such as spraying or by filling a cavity and then dumping excess material. Various types of liner materials may be used, and the selection of the liner material is in no way critical, as long as the material chosen exhibits the desired properties. Among suitable liner materials may be mentioned nitrocellulose solutions, myristic acid, wax emulsions, ammonium alginates, polyvinylalcohols, lacquers, and the like.

The liner material should have a viscosity such as to allow the correct thickness of the liner to be placed upon the toroid and/or the insert surface, and these parts then assembled and filled with the dielectric filler. The liner material must substantially completely burn away before the expansion of the dielectric filler into the cavity left by the liner material, and the liner material must leave no residue which would impair the electrical performance of the resulting assembly.

One typical method of applying the liner material to the toroid would be to heat the toroid to 80° F. to dry the inner diameter of the toroid, and then pour in a solution of the liner material, in any suitable diluent or solvent, while closing off one end of the toroid. Thereafter, excess liner solution can be poured off, and the toroid can be again heated at a temperature below the liner material burning temperature, say at 80° F., in an oven to completely drive off the diluent or solvent. If desired, the insert may be similarly coated with the liner material solution. Of course, more than one coat of liner material may be applied if desired. The above procedure generally produces liners about 0.0025 to 0.005 inches thick. The heating cycle is not absolutely necessary, but is useful in order to expedite drying. If desired, drying could be accomplished in ambient air over more extended periods of time.

It is relatively simple to test a candidate liner material to see if it would be satisfactory. A dispersing agent is used , to see if the liner material forms a solution, dispersion or the like which will adhere to the ceramic pieces. The liner material may be dried out, and the thickness of the dried material measured to get an indication of the degree of void area for expansion which could be obtained. The liner material can then be burned out at a temperature of at least 100° F. to insure that substantially complete burn-out occurs. The temperatureat which the liner material burns should be at least 20° F. below the curing temperature of the dielectric filler, and preferably the liner burns at a temperature below 300° F. Then the electronic properties of any residual ash remaining after the burning operation can be checked, preferably by actually making up a toroid assembly using the liner material. The dielectric loss of the toroid assembly caused by the liner material should not be significant. Generally, the dielectric loss of the toroid assembly will be within 10% of the dielectric loss of the original toroid, preferably within the 5% of the original toroid dielectric loss, and most preferably within 1% of the dielectric loss of the original toroid. The $B_R$ hysteresis loop should be substantially unchanged, and any change of the $B_R$ value should be less than 5% of the $B_R$ value of the original toroid.

The toroids which are used are conventional microwave toroids of ferrite or garnet materials, and are used in conventional configurations, wherein a ceramic insert is placed inside the toroid. The ceramic inserts are conventional in the art, and no special materials must be used.

The filler is a dielectric material containing at least one titanium compound, and is preferably a thermosetting polymer doped with titanium dioxide, with a dielectric constant of about 16. The dielectric filler is based upon a thermosetting polymer which is a low dielectric loss polymer. This polymer need not have high physical properties, such as tensile strength, adhesive strength and the like. The polymer should, of course, resist the temperatures utilized in the burning of the liner material, and should cure at a temperature of about 200° F. to about 400° F. or higher, although this curing temperature range is in no way critical. The dielectric filler is preferably based upon a silicone resin or an epoxy resin, although within the broad parameters mentioned above any suitable synthetic resins known to the art may be utilized. In addition to the titanium dioxide, or in place thereof, other suitable titanium compounds could be used in the dielectric filler, such as, for instance, magnesium titanateor lanthium titanate. The dielectric filler is preferably filled with a low dielectric value titanium compound at a level such as to produce a final dielectric constant of at least about 16. However, the dielectric constant of the filler material might be as low as about 6 or so, but it is strongly preferred that the dielectric constant value be as high as possible. Preferably the dielectric titanium compound is present in the dielectric filler in such an amount as to represent a practical maximum level, bearing in mind that the composition before curing must have enough liquidity to be assembled or placed into position, and the thermosetting polymer must be present in an amount such as to result in adequate adhesion and strength after curing.

DESCRIPTION OF THE DRAWINGS

The invention will be understood more clearly with reference to the accompanying drawings wherein

In FIG. 1 generally rectangular toroid 1 has ceramic insert 2 inserted therein. A layer of liner material 3 is on the inner surface of toroid 1, and another layer of liner material 4 is on the outer surface of the ceramic insert 2. The space between the liner material 3 and the liner material 4 is filled with dielectric filler 5.

Figure 1:
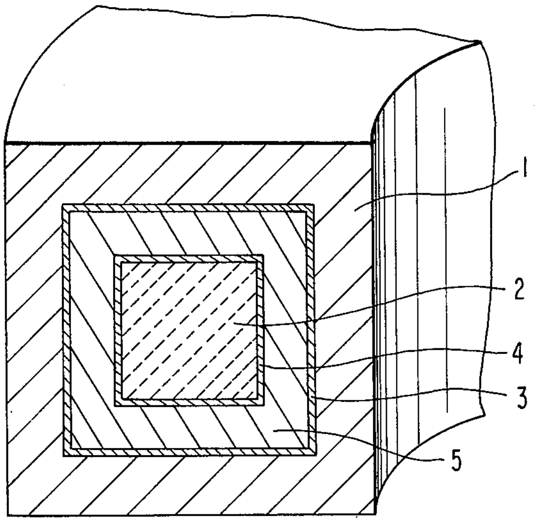
FIG. 1 illustrates the assembly of the present invention, which can be heated to burn out the temporary liner and to cure the dielectric filler in order to form a toroid assembly suitable for microwave applications.
Figure 2:
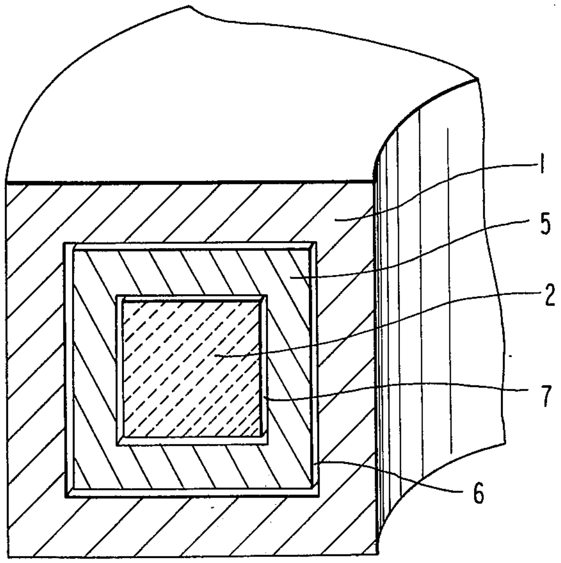
FIG. 2 is an illustration of the assembly of FIG. 1, after the liner has been burned to form gaps in the assembly into which material can expand or contract.

Upon heating to a temperature above the burning point of the liner material 3, 4, the liner material 3,4 burns away to leave gaps 6, 7, as shown in FIG. 2.

Figure 3:
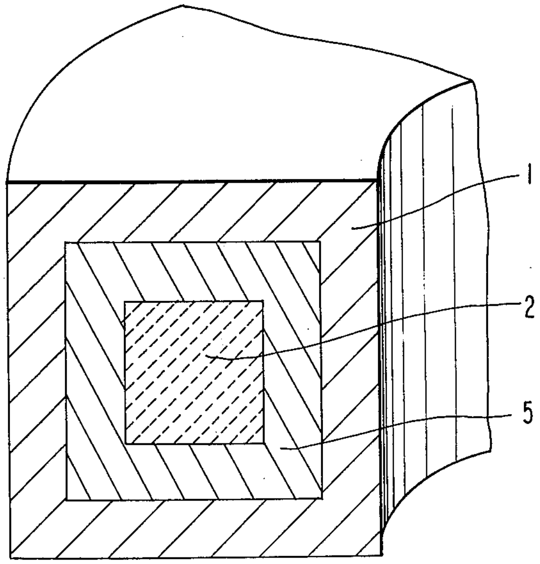
FIG. 3 is a view of the assembly of FIG. 2, after a further, higher heating step has caused the dielectric filler to cure.

As illustrated in FIG. 3, upon heating to a higher temperature, above the curing temperature of the dielectric filler, the filler cures while relative expansion and/or contraction of the assembly components into gaps 6,7 result in a final toroid assembly wherein the dielectric filler 5 is adhered to toroid 1 and ceramic insert 2. The assembly does not have a high level of residual stresses, as encountered by the prior art in previous production of toroids of the same general natures, and thus the electrical properties of the toroid assembly are substantially unimpaired.

EXAMPLES OF THE INVENTION

Example 1

This example utilized a garnet toroid, with the garnet being of the following composition:

$Fe_2O_3$ 62.4 mol percent
$Y_2O_3$ 24.3 mol percent
$Gd_2O_3$ 13.2 mol percent
$MnO_2$ 0.1 mol percent The toroid had a height and a width of about ¼ inch, and a length of slightly over 5 inches. The wall thicknesses of the rectangular toroid were 50 thousandths of an inch, and the outer corners of the toroid were beveled at a 45° angle, to produce a width, measured diagonally from the inner corner of the toroid, of 58 thousandths of an inch.

The composition of the ceramic insert was as follows:

Barium oxide 20 mol percent
Titanium dioxide 80 mol percent

The ceramic insert had a shape generally corresponding to the inner dimensions of the toroid, with a clearance of 10 thousandths of an inch on each side. The ceramic insert was approximately the same length as the toroid, and had a pair of wire relief holes on two opposing faces extending the length of the insert. The wire relief channels or holes had a depth of 38 thousandths of an inch and a width of 18 thousandths of an inch.

The liner material was made by Pierce and Stevens Chemical Corporation, and was a solution of nitrocellulose in amyl acetate. The liner solution was applied by dipping both the toroid and the ceramic insert therein, and the dipped parts were placed in an oven at 80° F. to facilitate drying. The dried layer of liner material was about ½ mil thick, and a meniscus of liner material in the inner corners of the toroid resulted in a thickness of about 2 mils of dried liner material at those points.

The dielectric iller was made by Custom Materials, a Division of 3M, and was a silicone resin (of the Dupont R-7521 type) filled with 25 volume percent of titanium dioxide. This dielectric filler had a dielectric constant of about 16, and was applied to the inner face of the toroid and to the outer face of the ceramic insert, and then these parts were pressed together, extruding out any excess dielectric filler.

The thus assembled toroid was then subjected to a firing step, by placing the filled toroid in an oven which was programmed to raise the temperature therein from about ambient temperature up to about 370° F. at the rate of approximately 100° F. per hour. Once the oven, and the toroid assembly contained therein, were at the desired temperature of 370° F., the temperature was programmed downward to ambient temperature, using the same relative rate of temperature change.

During the rise in the oven temperature, the nitrocellulose was burned away from the assembly, leaving no detectable residue and no detectable residual electrical properties. The silicon resin was thereafter cured at a higher oven temperature to bind the ceramic insert to the toroid, with the dielectric loss of the toroid within 1% of the dielectric loss of the original toroid, and the $B_R$ hysteresis loop remained substantially unchanged.

While the above description has been with reference to the method of gap formation involving the use of a temporary liner material, which is a decidedly preferred embodiment of the present invention, it will be appreciated by those in the art that other methods of forming such a gap may be utilized. For instance, a gap may be formed by melting out a liner material which has a low melting point, a gap may be formed by sublimation of a sublimable liner material, a layer of liner material may be dissolved by the use of appropriate solvents, which solvents which should not adversely effect the dielectric filler composition, or it is even possible to form a gap by molding the dielectric filler material in a separate molding operation, wherein the polymerization of the thermosetting polymer in the dielectric filler is stopped at the so-called "A" stage, that is, before substantial cross-linking has occurred. Thereafter, the "A" staged dielectric filler is inserted into the toroid assembly, with the molding operation of the dielectric filler producing the desired gap or space into which relative expansion or contraction of the toroid components can occur during the so-called "B" stage or curing step, wherein the thermosetting polymer is substantially completely cured by a cross-linking reaction.

What is claimed is:

1. An assembly which can be heated to form a toroid assembly suitable for microwave applications, said assembly consisting essentially of a ferrite or garnet toroid having an inner surface, a ceramic insert located within said toroid and having an outer surface facing said inner surface, the circumference of said inner surface being greater than the circumference of said outer surface so that an annular area is defined between said toroid and said ceramic insert, a layer of temporary liner material partially filling said area and adhered to said outer surface, said inner surface, or both, and a heat-curable dielectric composition having a dielectric constant of at least about 6 substantially filling the remainder of said area, said liner material burning at a temperature of about 100° F. to a temperature below the curing temperature of said dielectric composition to leave essentially no ash having electro-mechanical properties, the thickness of said liner material being such that upon the liner material being burned, a space is provided for relative expansion and contraction of the toroid, the ceramic insert and the dielectric filler to avoid the placing of undue stress upon said assembly during curing of said dielectric filler so that the $B_R$ value of the cured toroid assembly is within 5% of the $B_R$ value of the original toroid.

2. Assembly of claim 1, wherein said dielectric composition has a dielectric constant when cured at about 16.

3. Assembly of claim 1, wherein said liner material burns at a temperature below 300° F.

4. Assembly of claim 1, wherein said dielectric composition cures at a temperature of at least 200° F.

5. Assembly of claim 4, wherein said dielectric composition cures at a temperature of about 200° - about 400° F.

6. Assembly of claim 1, wherein the dielectric loss value of the toroid assembly formed from said assembly is within 10% of the dielectric loss of value of said ferrite or garnet toroid.

7. Assembly of claim 1, wherein a layer of said liner material is formed on both the outer surface of the ceramic insert and the inner surface of said toroid.

8. Assembly of claim 1, wherein the $B_R$ loop of the toroid assembly formed from said assembly is substantially unchanged from the $B_R$ loop of the ferrite or garnet toroid.

* * * * *